United States Patent Office 3,342,880
Patented Sept. 19, 1967

3,342,880
ADAMANTANE DERIVATIVES
Heinz Fritz Reinhardt, Claymont, Del., assignor to E. I. du Pont de Nemours and Company, Wilmington, Del., a corporation of Delaware
No Drawing. Filed Mar. 14, 1963, Ser. No. 265,062
3 Claims. (Cl. 260—648)

This application is a continuation-in-part of my co-pending application Ser. No. 106,172, filed Apr. 28, 1961, now abandoned.

This invention relates to a new class of chemical compounds having unusual properties. According to this invention, there are provided compounds of the formula $$R-A-(X)_m-A-R'$$

in which A is a 1,3-adamantylene group (a 1,3-radical of adamantane(tricyclo[3.3.1.1$^{3,7}$]decane)) which has the formula

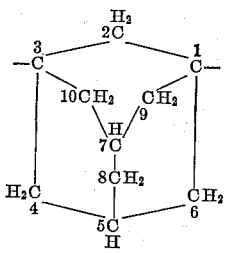

and X, R and R' are substituents capable of combining with a tertiary alkyl carbon atom (i.e. t-butyl radical) to form stable compounds, X being a divalent radical. R and R' may be the same or different and may be hydrogen or a monovalent radical, m is an integer equal to 0 or 1, and at least one of R and R' has a molecular weight greater than six when m is zero. All adamantylene radicals referred to herein are 1,3-adamantylene radicals and all biadamantane derivatives are 3,3'-substituted-1,1'-biadamantanes.

R and R' in the above structural formula are any substituent such as hydrogen, alkali metal, halogen (preferably bromine or chlorine) or a monovalent radical including α,β unsaturated hydrocarbons such as vinyl, allyl, etc., aryl, hydroxy aryl, aryloxy, alkyl, hydroxy alkyl, alkoxy, carboxy, carbalkoxy, carbaryloxy, aminoalkyl, aminoaryl, hydroxy, cyano, amino, carboxyalkyl, carboxyaryl, cyanoalkyl, cyanoaryl, carbamyl, and the like. In general, R and R' are any functional group conventionally useful for preparing polymers or any group capable of forming a derivative of a hydrocarbon.

When m in the above structural formula is zero, the compounds are 3,3'-derivatives of -1,1'-biadamantane and are particularly useful for forming polymers with unusually high melting points and exceptional stability. Thus, 3,3'-dibromo-1,1'-biadamantane polymerizes to form a polymer with very great stability and does not melt even at 400° C. Similarly, polyamides, polyethers, and polyesters containing adamantylene radicals are prepared from the corresponding amino, hydroxy and carboxy derivatives of biadamantane. Because of the ease in which two polymer forming functional groups can be introduced into the biadamantane molecule, the compounds of the present invention provide an easy and convenient method for preparing polymers containing adamantylene groups in the backbone of the polymer chain. This is in contrast to the known diffculty attendant upon introducing two functional groups into a single adamantane molecule, and the impracticability of preparing polymers therefrom. The present invention provides a convenient route to polymers containing adamantyl and adamantylene groups.

Some of the preferred compounds of this invention having the above structural formula in which m=0 are 3,3'-diamino-1,1'-biadamantane; 3,3' - diaminomethyl-1,1'-biadamantane; 3,3'-dicarbamyl - 1,1'-biadamantane; 3,3'-dicarbamylmethyl-1,1'-biadamantane; 3,3'-dihydroxy-1,1'-biadamantane; 3,3'-dihydroxymethyl-1,1' - biadamantane; 3,3'-dicarboxy-1,1'-biadamantane; 3,3' - dicyano-1,1'-biadamantane; 3,3'-dicyanomethyl-1,1'-biadamantane; 3,3'-dialkoxy-1,1'-biadamantane; 3,3'-diaryloxy-1,1' - biadamantane; 3,3'-diaryl-1,1'-biadamantane; 3,3'-dialkyl-1,1'-biadamantane; 3,3'-dicarbalkoxy-1,1'-biadamantane; 3,3'-dicarbaryloxy-1,1'-biadamantane. Phenyl and phenylene are the preferred aryl groups in the above compounds and lower alkyl groups, those with less than five carbon atoms, are preferred over larger alkyl chains.

When m is one in the above structural formula, the compounds are bis(adamantyl) compounds and are useful for preparing polymers in which the backbone of the polymer contains spaced adamantylene radicals. These polymers are stable high melting materials which are useful where stability in the presence of great heat is desirable.

The R substituent in the above structural formula will vary depending upon the end use of the compound and the particular properties desired in a polymer or other material to be prepared. The R substituent may be introduced into the adamantylene ring by conventional procedures as, for example, by brominating and then replacing the bromine substitutents by the desired groups. Also, it may be introduced into the ring prior to formation of the bis(adamantyl) compound. Representative bis(adamantyl) compounds include bis(adamantyl)tetramethyl stannoethane, p-phenylene diadamantane, methylene bis(adamantyl amide), diadamantyl ether, diadamantyl ketone, the adamantyl ester of adamantyl carboxylic acid, diadamantyl sulfonimide, diadamantyl imine, azo diadamantyl, diadamantyl hydrazide, N,N'-diadamantyl urea, bicarbamoyl diadamantyl, methyleneoxy-carbon diadamantyl, diadamantyl thioether, diadamantyl sulfone, silylene diadamantyl, and the like.

From the above representative compounds, it can be seen that X, in the above structural formula, may be any of the divalent radicals: phenylene, biphenylene, alkylene, oxy, carbonyl, carbonyloxy, carboxamido, sulfonamido, imino, azo, hydrazo, ureylene, bicarbamoyl, methyleneoxy carbonyl, ethyleneoxy carbonyl, thio, sulfonyl, silylene, hydrocarbyloxy silylene and the like. Any divalent radical which will combine with two t-butyl radicals under conventional reaction conditions to form a stable compound may be utilized.

Examples 1 to 19 illustrate how representative monomeric compounds of this invention may be prepared. All parts and percentages are by weight unless otherwise indicated.

EXAMPLE 1

*3,3'-dibromo-1,1'-biadamantane*

To 12 g. sodium (50% dispersion in xylene) is added 25 ml. of benzene, and the mixture is cooled to 5° C. using wet ice. The sodium dispersion is continuously stirred and kept under a blanket of nitrogen. Then a solution of 20 g. 1-bromoadamantane in 150 ml. ethyl ether, which is cooled to 5° C., is added to the sodium dispersion all at once. No increase of temperature is observed. The mixture is stirred for 3 days and the temperature is not allowed to rise above 15° C. The reaction product is filtered and the solids are washed with ether and benzene. The filtrate is then concentrated by bolwing air over the solution and the precipitation of biadamantane begins.

The solution is concentrated to about 30 ml. and then cooled with Dry Ice-acetone. The precipitate is filtered off and washed with methanol and recrystallized from dioxane. Ten grams of biadamantane (79% of theory) having a melting point of 286–88° C. (theoretical 296° C.) is obtained.

Biadamantane (3.75 g.) is charged into a round-bottom flask fitted with a long reflux condenser. Then 20 ml. of bromine is added and hydrogen bromide is formed. The main reaction is over after 15 minutes. The reaction mixture is then heated to reflux (61° C. pot temperature) for 3 hours. The reaction product is diluted with 75 ml. of carbon tetrochloride after cooling to room temperature and transferred to a separatory funnel. The carbon tetrachloride solution is then shaken with water and sodium bisulfite is added until excess bromine is destroyed. The carbon tetrachloride layer is separated and the water layer extracted twice with 50 ml. of carbon tetrachloride. The combined carbon tetrachloride solutions are dried over sodium sulfate and the carbon tetrachloride is stripped. The 3,3'-dibromo-1,1'-biadamantane product remains in the pot, and is precipitated with methanol, filtered off and dried at 80° C. The yield is 4.8 g. (81% of theory). The compound recrystallizes from dioxane in monoclinic prisms and has a melting point of 236–237° C. It is soluble in benzene, toluene, carbon tetrachloride and insoluble in methanol and ethanol.

$C_{20}H_{28}Br_2$ (428.3) Calc.: C, 56.08; H, 6.58; Br, 37.31. Found: C, 56.09; H, 6.68; Br, 37.19.

EXAMPLE 2

*3,3'-di-p-anisyl-1,1'-biadamantane*

3.3'-dibromo-1,1'-biadamantane (5.0 g.) is dissolved in 25 ml. of anisole and heated to reflux (155° C.) for 5 hours. Hydrogen bromide is evolved after 15 minutes of refluxing. The main reaction ceases after about one hour. The reaction product is filtered in the hot state and on cooling to room temperature small flakes crystallize. The crystals are filtered off and recrystallized from 20 ml. of xylene. We obtain 5.17 g. (72% of theory related to dibromobiadamantane) of 3,3'-di-p-anisyl-1,1'-biadamantane having a melting point of 262–263° C. The compound is soluble in dimethyl formamide and aromatic hydrocarbons and insoluble in acetone, ethanol, ethyl ether and carbon tetrachloride.

$C_{34}H_{42}O_2$ (482.71) Calc.: C, 84.50; H, 8.77. Found: C, 84.61; H, 8.61.

EXAMPLE 3

*3,3'-diphenyl-1,1'-biadamantane*

A mixture of 0.3 g. of 3,3'-dibromo-1,1'-biadamantane and a trace of ferric chloride (sublimed) in 8 ml. of benzene is refluxed for three hours. The hydrogen bromide evolution has ceased after this time and the hot liquid is filtered off. The benzene solution is concentrated by blowing air over the liquid. There is obtained 0.16 g. of 3,3'-diphenyl-1,1'-biadamantane (55% of theory based on the dibromobiadamantane), which crystallizes from the concentrated benzene solution in the form of small flakes. The product after recrystallization from a small amount of benzene has a melting point of 268–269° C.

$C_{32}H_{38}$ (422.7) Calc.: C, 90.93; H, 9.06. Found: C, 90.95; H, 9.09.

EXAMPLE 4

*3,3'-dicyano-1,1'-biadamantane*

To 2 g. of cuprous cyanide in a round-bottom flask fitted with a distilling head, 7.5 ml. of pyridine is added. Then 2.5 g. of 3,3'-dibromo-1,1'-biadamantane is added to the pyridine complex and heat the reaction mixture slowly to 240° C., whereby some pyridine distills off to obtain a hard, black solid, on cooling to room temperature, which is extracted with benzene for 2.5 days. Then the benzene is stripped off and the remaining solids are extracted with hot ethanol, and then filtered off. A small amount of 3,3'-dicyano-1,1'-biadamantane crystallizes from the alcohol solution on cooling in the refrigerator.

The remaining product of the benzene extraction is extracted 48 hours with boiling ethanol. The ethanol solution yields additional 3,3'-dicyano-1,1'-biadamantane on cooling. The yield is about 1.5 g. (80% of theory) and the melting point of the white crystalline compound is 261–262° C. (closed capillary).

$C_{22}H_{28}N_2$ (320.5). Calc.: C, 82.45; H, 8.81; N, 8.74. Found: C, 82.09; H, 9.09; N, 8.75.

The infrared spectrum of the compound verifies its composition.

EXAMPLE 5

*Bis(adamantyl)-4,4'-diphenyl ether*

To 21.5 g. (0.1 mole) of 1-bromoadamantane, in a three-neck flask (thermometer and nitrogen, stirrer, reflux condenser) 8.5 g. (0.05 mole) of diphenyl ether, 10 g. of aluminum chloride anhydrous and 75 ml. of carbon disulfide are added. This mixture is refluxed for four hours. After that time, hydrogen bromide formation has almost ceased and the product is filtered after cooling to room temperature. The $CS_2$ solution is concentrated by blowing air over the liquid and then the concentrated carbon disulfide solution is stirred into excess methanol using vigorous agitation. There is obtained 18 g. of a tan product which is refluxed with ethanol for 15 minutes. The insoluble product is separated and recrystallized from dimethyl acetamide. There is obtained 15 g. of a white powder [bis(adamantyl)-4,4'-diphenyl ether] which forms a highly viscous melt on heating to 170–175° C. The transparent melt stays colorless on heating to 300° C.

EXAMPLE 6

*Bis(adamantyl)-1,4-benzene*

To 10.6 g. (0.05 mole) of 1-phenyl adamantane in a three-neck, round-bottom flask (thermometer and nitrogen, stirrer, reflux condenser) 10.7 g. (0.05 mole) of 1-bromoadamantane, 5 g. sublimed ferric chloride and 50 ml. of carbon disulfide are added. The solution is heated to reflux, but no hydrogen bromide formation is observed. The solution is then concentrated by distilling off some carbon disulfide (~50 ml.) and hydrogen bromide begins to form. The concentrated solution is refluxed for an additional two hours and then the remaining carbon disulfide is stripped off. The dark solid reaction product is recrystallized from dioxane. There is obtained 2.5 g. of bis(adamantyl)-1,4-benzene having a melting point of 299–300° C. (closed capillary) after repeated recrystallization from dioxane. The white leaflets sublime slowly above 200° C. Infrared analysis confirms the structure of the product.

$C_{26}H_{34}$ (346.6). Calc.: C, 90.12; H, 9.88. Found: C, 89.23; H, 9.71; M.W. 368.

EXAMPLE 7

*Methylene-bis-adamantylamide*

To .063 g. of adamantylamide are added 5 ml. of formaldehyde (37%) and 10 ml. of concentrated sulfuric acid. The reaction mixture is stirred for two hours at room temperatures and then poured on 75 g. of wet ice. The white precipitate is filtered off and washed with water, dried and recrystallized from cyclohexane. There is obtained 0.3 g. of methylene-bis-adamantylamide, a white crystalline product, having a melting point of 269–271° C. (closed capillary). The compound sublimes slowly above 200° C. Infrared analysis confirms the structure of the compound.

EXAMPLE 8

*Diadamantyl terephthalate*

To 3.8 g. (0.025 mole) of 1-hydroxyadamantane dissolved in 25 ml. of pyridine, 2.53 g. (0.0125 mole) of terephthalic acid dichloride is added under agitation. The cloudy reaction mixture is refluxed for about one hour. After that time, the reaction mixture becomes clear. It is stirred into excess water and the white precipitate formed is filtered off, washed with water and dried. About 2 g. of terephthalic acid diadamantyl ester is obtained in the form of transparent plates after recrystallization from benzene (melting point 240–245° C. in closed capillary), which sublimes slowly above 150° C.

$C_{28}H_{34}O_4$ (434.6). Calc.: C, 77.38; H, 7.88. Found: C, 77.03; H, 8.05; M.W. 410.

The infrared spectrum is in agreement with the indicated structure.

EXAMPLE 9

3,3'-dicarboxy-1,1'-biadamantane

To 0.5 g. of 3,3'-dicyano-1,1'-biadamantane, in a round-bottom flask fitted with reflux condenser, is added a mixture of 5 ml. concentrated sulfuric acid, 5 ml. of concentrated acetic acid and 5 ml. of water. This reaction mixture is heated to reflux under stirring for 30 minutes. The white creamy reaction product (3,3'-dicarboxy-1,1'-biadamantane) is filtered off, washed with water and methanol, and then dried under vacuum. Recrystallization from dimethyl acetamide gives 0.55 g. of the diacid (melting point 352–355° C.). It is insoluble in water, benzene, ethanol and acetic acid.

$C_{22}H_{30}O_4$ (358.48). Calc.: C, 73.71; H, 8.43. Found: C, 73.70; H, 8.78.

The infrared spectrum is in agreement with the stated structure.

EXAMPLE 10

3,3'-dicarbomethoxy-1,1'-biadamantane

A mixture of 2 g. of 3,3'-dicarboxy-1,1'-biadamantane and 30 ml. of thionylchloride is refluxed for 15 minutes. After that time, a clear, slightly brown solution has formed. Excess thionyl chloride is stripped off under vacuum and the adamantyl dicarboxylic acid dichloride of the dicarboxylic acid of biadamantane remains in the pot as white crystalline solid which is not purified further. To the diacidchloride is then added 25 ml. of anhydrous methanol. After refluxing the mixture for 30 minutes, the hot solution is filtered. On cooling to room temperature, 1.95 g. (90% of theory) of colorless crystals separates and are recrystallized from methanol. The dimethyl ester melts at 123–124° C. (closed capillary).

$C_{24}H_{34}$ (386.53). Calc.: C, 74.57; H, 8.87. Found: C, 74.50; H, 8.94.

EXAMPLE 11

3,3'-dimethylol-1,1'-biadamantane

A solution of 0.5 g. of lithium aluminum hydride in 20 ml. of tetrahydrofuran is prepared in a small round-bottom flask fitted with thermometer, stirrer and condenser. To the agitated solution is then added slowly a solution of 3.86 g. of 3,3'-dicarbomethoxy-1,1'-biadamantane in 15 m. of tetrahydrofuran whereupon the temperature rises to 45–80° C. The reaction mixture is then heated to reflux for one hour, cooled to room temperature and poured onto 125 ml. of wet ice containing 10 ml. of concentrated hydrochloric acid. The white crystalline product formed is filtered off, washed with water and dried. Recrystallization from benzene yields 3.1 g. (94% of theory) of 3,3'-dimethylol-1,1'-biadamantane in the form of white needles (melting point 217–218° C.).

$C_{22}H_{34}O_2$ (330.51). Cal.: C, 79.94; H, 10.36. Found: C, 80.09; H, 10.29.

EXAMPLE 12

Bis(adamantyl)tetramethyl stannoethane

A solution of tetramethyl stannoethane is prepared in liquid ammonia by adding 1.84 g. of sodium (0.02 mole) to a stirred suspension of 4.39 g. of dimethyltin dichloride in about 125 ml. of liquid ammonia. The reaction is carried out under a blanket of nitrogen in a three-neck Dewar flask fitted with ammonia and nitrogen inlet and a Dry Ice condenser. To the deep red solution of tetramethyl stannoethane disodium is added 4.30 g. (0.02 mole) of 1-bromoadamantane under stirring. The bromoadamantane disappears slowly and the deep red color of the reaction product changes to a tan suspension over a period of three hours. The ammonia is allowed to evaporate and we obtain 7.5 g. of a tan powder. This powder is extracted with 100 ml. of refluxing benzene. After stripping off the benzene, we obtain 2 g. of a white crystalline product which is recrystallized from dioxane and absolute ethanol. Thin long needles of bis(adamantyl)tetramethyl stannoethane (melting point 154–156° C.) are obtained.

$C_{24}H_{42}Sn_2$ (567.99). Calc.: C, 50.75; H, 7.45. Found: C, 50.72; H, 7.35. M.W. Found: 575 (in boiling benzene).

The infrared spectrum is in agreement with the stated structure.

EXAMPLE 13

3,3'-bis-aminomethyl-1,1'-biadamantane

Lithium aluminum hydride (0.6 g.) is finely powdered and charged into a three-neck flask (fitted with a thermometer, nitrogen inlet, addition funnel and reflux condenser) together with 15 ml. of anhydrous tetrahydrofuran. A solution of 2.5 g. of 3,3'-dicyano-1,1'-biadamantane in 20 ml. of anhydrous tetrahydrofuran is added over a period of 15 minutes. The reaction mixture is then heated to reflux for 45 minutes. The reaction product is poured onto wet ice containing diluted hydrochloric acid after cooling to room temperature. The precipitate is filtered off and recrystallized from dilute hydrochloric acid. About 2 g. of the dihydrochloride of 3,3'-diaminoethyl-1,1'-biadamantane in the form of fine white needles is obtained. The melting point of this compound is above 320° C.

The free diamine is obtained from the dihydrochloride by reaction with ammonia.

EXAMPLE 14

3,3'-diphenoxy-1,1'-biadamantane

Potassium phenate is prepared from 16.8 g. of phenol and 3.9 g. of potassium and heated with 21.4 g. of 3,3'-dibromo-1,1'-biadamantane and 0.1 g. of copper bronze at 210° C. for two hours. The 3,3'-diphenoxy-1,1'-biadamantane obtained is recrystallized from toluene. The reaction must be carried out in a closed system to avoid sublimation of the adamantane.

EXAMPLE 15

3,3'-dihydroxy-1,1'-biadamantane 11.5 g. of 3,3'-dibromo-1,1'-diadamantane, 20 g. of silver nitrate, 120 ml. of dioxane, and 40 ml. of water are charged into a three-necked flask fitted with thermometer, stirrer and reflux condenser. The mixture is then heated to gentle reflux for 3.5 hours. The reaction product is cooled to room temperature and the solids are filtered off. The solids are then extracted with refluxing dioxane. On cooling to room temperature, transparent needles crystallize (melting point 271–272° C. closed capillary) to yield 3.5 g. (43% of theory) of 3,3'-dihydroxy-1,1'-biadamantane.

$C_{20}H_{30}O_2$ (302.5). Calc.: C, 79.42; H, 9.99. Found: C, 79.53; H, 9.98.

EXAMPLE 16

1,1'-biadamantane-3,3'-dibenzoate

About 6 g. of 3,3'-dihydroxy-1,1'-biadamantane is dissolved in 30 ml. of anhydrous pyridine and 5.6 g. of benzoyl chloride is added to this solution over a period of 15 minutes, with stirring. This mixture is stirred for 24 hours at room temperature and then slowly heated to 90° C. and maintained at this temperature for 30 minutes. The cooled reaction product is poured into water and solid 1,1'-biadamantane-3,3'-dibenzoate is separated by filtration.

EXAMPLE 17

3,3'-dimethacrylyl-1,1'-biadamantane

A mixture of 6 g. of 3,3'-dihydroxy-1,1'-biadamantane, 8.8 g. of methacrylyl chloride, 0.5 g. of hydroquinone and 50 ml. of anhydrous pyridine is heated to 95° C. for eight hours with stirring and a blanket of nitrogen. The reaction mixture is then poured into water and the organic material is extracted with toluene. The toluene solution is dried over sodium sulfate and the 3,3'-dimethacrylyl-1,1'-biadamantane is separated after stripping off the toluene. This methacrylate polymerizes to colorless, crosslinked resins in the presence of peroxides.

EXAMPLE 18

3,3'-bis(p-phenoxyphenyl)-1,1'-biadamantane

A mixture of 5 g. of 3,3'-dibromo-1,1'-biadamantane and 30 ml. of diphenyl ether is heated to 250° C. for four hours. The HBr formation ceases after about one hour. The liquid reaction product is allowed to cool to room temperature and methanol is added to crystallize a white solid, which is filtered off and recrystallized from acetone. The physical properties of the compound obtained show the product to be 3,3'-bis(p-phenoxyphenyl)-1,1'-biadamantane.

EXAMPLE 19

3,3'-di-(p-hydroxyphenyl)-1,1'-biadamantane 5 g. of 3,3'-dibromo-1,1'-biadamantane and 30 g. phenol are reacted by heating slowly under a slow stream of nitrogen (to remove HBr as formed) and stirring. Hydrobromic acid formation begins at 50° C. and at temperatures above 85° C. is rapid. After 36 minutes, the refluxing temperature is 182° C. and the product is refluxed an additional 30 minutes. On cooling to room temperature, a white solid precipitates and is refluxed with about 500 ml. of methanol. The solid remaining in the pot is filtered off in the hot state and washed with methanol. The yield is 5.2 g., which is nearly quantitative. The product is recrystallized for analysis from dimethyl acetamide and tetrahydrofuran, giving fine leaflets of melting point 343–344° C., soluble in hot dimethyl acetamide and tetrahydrofuran, insoluble in water, dioxane, methanol, benzene, $CCl_4$, cyclohexane and 50% aqueous NaOH. $C_{32}H_{38}O_2$ (454.7). Calc.: C, 84.53; H, 8.42. Found: C, 84.07; H, 8.54.

There are also provided, according to this invention, a new class of polymers having unusual properties. These polymers have an inherent viscosity of at least 0.1 at 25° C. in a 1:1 mixture of 1,1,2-trichloroethane and phenol at a polymer concentration of 0.1% by weight, and are characterized by repeating structural units, at least 50% of which contain an adamantyl or adamantylene radical. Polymers containing a predominant proportion of adamantyl or adamantylene groups exhibit exceptional stability as well as very high melting points. These polymers are not only very stable toward heat-retaining good color over extended periods of time at high temperatures, but are also extraordinarily resistant to attack by acids, bases and ordinarily solvents, making them very useful in applications calling for hardness and durability in contact with corrosive materials. The film forming ability of the polymers and their stability and hardness renders them useful as protective coatings.

Polymers of this invention may be prepared from any of the above described biadamantane or bisadamantyl compounds containing suitable polymerizable functional groups or which may be modified to contain such groups. Homopolymers may be produced or other copolymerizable monomers may be reacted with the above adamantane derivatives to produce copolymers provided that at least 50% of the repeating structural units in such polymers contain an adamantyl or adamantylene radical and at least 50% of the total weight of the polymer is provided by such radicals.

Illustrative of the condensation polymers of this invention is the polyester formed by condensing dimethyl-adamantyl-1,3-dicarboxylate with 1,3-dimethylol adamantane. The polymer has the repeating structural unit

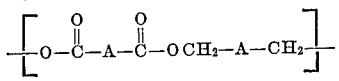

in which A is an adamantylene radical. This polymer forms a hard glossy film useful as a protective coating. It is extremely stable against attack by ordinary organic solvents and even concentrated hydrochloric acids, 90% formic acid and 5 M sodium hydroxide at room temperature. It is soluble in a 50:50 mixture of phenol and 1,1,2-trichloroethane. The polymer melts at about 250° C. and produces a colorless transparent film. Heating the polymer for eight hours in an open test tube at 325° C. produced no decomposition or even discoloration.

Addition polymers of this invention having the repeating structural unit

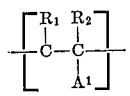

where $R_1$ and $R_2$ may be the same or different and may be hydrogen, alkyl or any other radical which when a substituent on the α-carbon atom of acrylic acid does not prevent the polymerization thereof under conventional polymerization conditions, and $A^1$ is a monovalent radical containing an adamantyl group, preferably a carbadamantyloxy group.

Preferred among the addition polymers of this invention is poly(adamantyl methacrylate). This polymer provides protective coating substantially superior in some respects to poly(methylmethacrylate) and poly(isobornyl)-methacrylate. In addition to exhibiting hardness equivalent to films of the latter two polymers, poly(adamantyl methacrylate) films provide considerably high imprinting resistance.

The following examples illustrate the preparation of polymers of this invention.

EXAMPLE 20

Polyester from adamantane dicarboxylic acid dimethyl ester-(1,3) and ethylene glycol 13.6 g. of adamantane dicarboxylic acid dimethyl ester-(1,3) (0.0539 mole), 7.4 g. of ethylene glycol (0.12 mole), 0.022 g. of calcium acetate dihydrate (0.15% based on diester), and 0.005 g. antimony dioxide (0.035% based on diester) are charged into a polymer tube fitted with a side arm (take off for methanol and ethylene glycol) and an opening at the top for the introduction of a capillary. The side arm of the polymer tube is connected to two cold traps which were cooled with Dry Ice-acetone. The polymer tube is slowly heated to 75° C. in a silicone oil bath to obtain a melt. A capillary through the neck of the polymer tube reaches the bottom of the tube, and nitrogen is slowly bubbled through the melt. The polymer tube is then heated to 157° C. whereby the distillation of methanol begins. The temperature is then increased to 290° C. over a period of 4.5 hours and methanol and excess glycol distill into the cold traps. Now vacuum is applied and the condensation is carried on for an additional three hours at 300° C. A viscous brownish melt of poly(ethylene adamantyldicarboxylate) solidifies on cooling.

EXAMPLE 21

Polyamide from 3,3'-dicyano-1,1'-diadamantane and formaldehyde

About 0.65 g. 3,3'-dicyano-1,1'-diadamantane, 10 ml. of concentrated sulfuric acid, and 7.5 ml. of formaldehyde (37%) are charged into an Erlenmeyer flask and stirred for 15 minutes at room temperature. Then the reaction product is slowly heated to 75° C. and a transparent, slightly yellow solution is obtained. The solution is stirred into 100 ml. of ice water whereby a white product precipitates which is filtered off and washed with water. About 0.75 g. of a white powder is obtained after drying for three hours at 80° C. under vacuum. The product melts at around 230° C. and forms a highly viscous melt. The polymer is soluble in dimethyl acetamide, insoluble in carbon tetrachloride, benzene and acetone. The infrared spectrum is in agreement with the stated structure.

EXAMPLE 22

Polyadamantane

A mixture of 1.57 g. (0.0037 mole) of 3,3'-dibromobiadamantane, 2 g. of sodium dispersion (50% in xylene) and 10 ml. xylene are heated slowly to 95° C. within a period of two hours. The reaction mixture is maintained for an additional two hours at 95° C. and then allowed to cool to room temperature. Solids are filtered off, washed with xylene and decomposed with 50 ml. of methanol. Solids thus obtained are filtered off and refluxed with water in order to remove inorganic material. The remaining solids are filtered off, washed with water and methanol and then dried. About 0.15 g. of a light tan powder is obtained, which did not melt at temperatures up to 420° C., but discolored above 380° C. The polymer is stable against refluxing concentrated hydrochloric acid and aqueous 5 M sodium hydroxide solution. The polymer contains at least twenty adamantylene radicals and has the structure

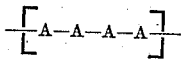

where A is a 1,3-adamantylene radical.

EXAMPLE 23

Polyester from adamantane dicarboxylic acid dimethyl ester-(1,3) and 1,3-dimethylol adamantane About 1.26 g. dimethyl ester (0.005 mole), 0.98 g. 1,3-dimethylol adamantane, 0.0004 g. antimony trioxide (0.035% based on dimethyl ester), and 0.0016 g. calcium acetate dihydrate are mixed and placed into a thick-wall test tube fitted with a stopper having a vacuum outlet. This outlet is connected to the house vacuum and the components were slowly heated to a maximum of 325° C. over a period of six hours under vacuum. Methanol formed during the condensation is taken off through the vacuum outlet. A highly viscous polymer is obtained which turns solid on cooling to 260° C., and at 220° C. a loose plug is formed in the test tube. The polymer shows a glossy and hard surface but can be shattered with a hammer. The polymer is insoluble in common organic solvents, but dissolves in a 50:50 mixture of 1,1,2-trichloroethane and phenol. Inherent viscosity of the polymer is 0.23 in an 0.1% solution in a 50:50 mixture of 1,2,2-trichloroethane and phenol at 25° C. Heating the polymer in air for eight hours at 325° C. produces no discoloration or decomposition.

$(C_{24}H_{32}O_4)_n$ Calc.: C, 74.96; H, 8.39. Found. C, 73.81; H, 8.46.

EXAMPLE 24

Condensation polymer from 3,3'-dibromobiadamantane and diphenoxyethane 3,3'-dibromobiadamantane (1.57 g., 0.0037 mole) is mixed with 0.75 g. (0.0037 mole) of diphenoxyethane and placed in a test tube. The mixture is then slowly heated to a maximum temperature of 292° C. over a period of four hours. After reaching a temperature of 245° C. evolution of hydrobromic acid begins. A dark, hard, and brittly polymer (1.5 g.) is obtained on cooling to room temperature. The polymer melts at 160° C. and has an inherent viscosity of 0.12 at 25° C. in a 0.1% benzene solution.

$(C_{34}H_{40}O_2)_n$ Calc.: C, 84.95; H, 8.38. Found: C, 83.57; H, 8.28.

EXAMPLE 25

Poly(adamantyl methacrylate)

A solution of 15.2 g. of 1-hydroxyadamantane (0.1 mole) in 75 ml. of pyridine is charged into a round-bottom flask fitted with stirrer, thermometer and reflux condenser. To this solution is added 8.85 g. (0.1 mole) of methacrylyl chloride whereby a white solid precipitates. This precipitate dissolves on heating the mixture to 85° C., and the slightly cloudy, light brown solution is heated to gentle reflux for one hour (pot temperature, 120° C.). The reaction product is allowed to cool to room temperature and is then filtered. The filtrate is extracted with 350 ml. of water and the organic layer is taken up in ethyl ether. The ethereal solution is dried over sodium sulfate and then distilled. A colorless liquid of monomeric adamantyl methacrylate (B.P.$_{0.5}$ 143–145° C., $n_D^{25}$ 1.4984) is obtained in a yield of 2.5 g. $C_{14}H_{20}O_2$ (220.3) Calc.: C, 76.32; H, 9.15. Found: C, 76.44; H, 9.14. Polymer found: C, 76.02; H, 9.19.

Monomeric adamantyl methacrylate is polymerized to a hard polymer in the presence of 1% of $\alpha,\alpha'$-azobisisobutyronitrile or benzoyl peroxide. Melting point of the polymer is 240–250° C.

Samples of adamantyl methacrylate, isobornyl methacrylate and methyl methacrylate are polymerized in toluene solution in the presence of benzoyl peroxide under the same conditions. The polyadamantyl methacrylate and polymethyl methacrylate formed are precipitated with hexane while polyisobornyl methacrylate is precipitated with methanol. The inherent viscosity of the polymers is then determined (the monomer samples used are free of inhibitor) and found to be as follows:

Inherent viscosity in 0.10% by weight solution in toluene at 25° C.:

PAMA [1] 0.42    PMMA [2] 0.33    PIBMA [3] 0.46

The results of the viscosity measurement show that the bulky adamantyl group in the form of the methacrylate does not inhibit polymerization.

The toluene solutions are partly used for casting films on primed metal panels. The films are dried for 30 minutes at 100° C. and then an additional 10 minutes at 150° C. The hardnesses of the films obtained were substantially equivalent and the polymers also did not exhibit a significant difference on the bump test.

The imprinting test (load 798 g., 30 minutes) shows polyadamantyl methacrylate film to have a considerably higher imprinting resistance of the (slight imprint at 195° C.) as compared to polyisobornyl methacrylate (clear imprint at 154° C., sticky at 185° C.) and polymethyl methacrylate which gives a clear imprint at 115° C.

The films obtained from the toluene solutions of the polymers are soluble in organic solvents such as toluene after baking at 150° C.

Polyadamantyl methacrylate shows a melting range of 230–250° C. as compared to polymethyl methacrylate and polyisobornyl methacrylate which melt between 110° C. and 130° C. Three films of the polymer samples mentioned above are exposed outdoors. No change in appearance was observed in the samples after eight months.

EXAMPLE 26

Adamantane carboxylic acid vinyl ester-(1)

About 75 g. crude adamantane carboxylic acid-(1), 500 ml. vinyl acetate, 6 g. mercuric acetate, 20 drops of concentrated sulfuric acid, and 0.5 g. hydroquinone are charged into a three-neck flask fitted with thermometer and nitrogen inlet, reflux condenser and magnetic ---
[1] Polyadamantyl methacrylate.
[2] Polymethyl methacrylate.
[3] Polyisobornyl methacrylate.

stirrer. The mixture is refluxed for eight hours under a slow stream of nitrogen and the reaction product is distilled under vacuum after stripping off the excess vinyl acetate and adding 50 ml. of Nujol. About 30 g. of a brownish distillate of boiling point $_1$ 100–110° C. is obtained and redistilled through a spinning band column giving a yellowish slightly cloudy product of boiling point $_{1.3}$ 89–90° C. The distillate is filtered and then shaken with a 5% aqueous potassium carbonate solution. About 25 ml. of ethyl ether is added for better separation of the organic layer. The organic layer is separated and dried over sodium sulfate. Redistillation of the product through an 18 inch spinning band column gives a colorless but slightly cloudy liquid of boiling point $_1$ $n$ 95° C. (column flooded). The material is filtered and the clear product has a $n_D{}^{25}$ 1.5010.

$C_{13}H_{18}O_2$ (206.3) Calc.: C, 75.69; H, 8.80. Found: C, 73.78; H, 8.81.

The infrared spectrum is in accordance with the stated structure.

About 2.5 g. of adamantane carboxylic acid vinyl ester and 0.0025 g. of benzoyl peroxide are heated for 18 hours at 101° C. in an open test tube. A brown polymer of the vinyl compound was thereby produced.

Poly(adamantyl acrylate) is prepared by the procedure of Example 25 by substituting acrylyl chloride for methacrylyl chloride.

EXAMPLE 27

*Polyester from adamantane dicarboxylic acid dimethyl ester-(1,3) and bis(4-hydroxymethylcyclohexyl)*

10.0 g. of adamantane dicarboxylic acid dimethyl ester-(1,3) (0.0396 mole), 18.1 g. of bis(4-hydroxymethylcyclohexyl) (0.08 mole; predominantly the trans, transisomer of the glycol), and 5 drops of an 8% solution of sodium hydrogen hexabutoxytitanate in n-butanol are charged into a polymer tube. Over a period of 2 hours the tube is heated at atmospheric pressure to 240° C. with evolution of methanol, after which vacuum is applied and the condensation is carried out for 4 hours at 275–285° C. at a pressure of 0.5 mm. of mercury. When crystallized in a mixture of methylene chloride and acetone and dried, the resulting polymer has a melting point of 185° C. and an inherent viscosity of 0.25. The crystallized polymer is subjected to solid phase polymerization by heating it at a pressure of 0.5 mm. with a capillary flow of nitrogen. The temperature, initially 180° C., is slowly raised to 230° C. over a period of 8 hours. The resulting polymer, poly(bicyclohexyl-4,4'-dimethylene 1,3-adamantanedicarboxylate), has a melting point of 230° S. and an inherent viscosity of 0.52 at 25° C. in a solution of 0.32 g. of the polymer in 100 ml. of a mixture of 1 part trifluoroacetic acid and 3 parts methylene chloride (by weight). A pressed film of the polymer exposed 96 hours to ultra-violet light from a xenon arc source, having an intensity 2.5 times the intensity of mid-day Florida sunlight, exhibits no change in color, indicating high resistance to photodegradation. Fibers of the polymer melt-spun and drawn by conventional techniques are insoluble in methylene chloride, trichloroethylene, and perchloroethylene. In a tensile strain recovery test of the fibers (designed to measure the ability of the fiber to recover from deformation when wet, as in laundering) the tensile strain recovery value is 64%. A value of 60% and above is considered good. The test is carried out by mounting a length of the fiber on a tensile tester with recording chart, raising a water bath maintained at 40° C. to immerse the filament while it is under zero tension, elongating the fiber at the rate of 10% per minute, holding the fiber at constant length for 2 minutes, removing the water bath, and finally allowing the filament to retract by reducing the load to a value to 0.042 g.p.d. The percent recovery is calculated by dividing the number of units of retraction by the number of units of elongation and multiplying by 100%. The procedure is carried out for elongations of 0.5, 1, 2, and 3% and the average tensile strain recovery is determined from a graph of percent recovery vs. total elongation in the range 0–3%.

A polyester having similar high resistance to photodegradation is prepared by substituting 0.08 mole of trans, cis, trans-1,3-bis(4-hydroxymethylcyclohexyl)cyclohexane for the bis(4-hydroxymethylcyclohexyl) in the above procedure.

EXAMPLE 28

*Polyester from adamantane dicarboxylic acid dimethyl ester-(1,3) and 1,4-dimethylolcyclohexane*

10.0 g. of adamantane carboxylic acid dimethyl ester-(1,3) (0.0397 mole), 15.0 g. of 1,4-dimethylolcyclohexane (0.104 mole; predominantly the trans-isomer) and 5 drops of an 8% solution of sodium hydrogen hexabutoxytitanate in an n-butanol are charged into a polymer tube. Methanol is removed over a period of 2.5 hours as the tube is heated at atmospheric pressure to 230° C., after which vacuum is applied and the condensation is carried out for 4 hours at 285–295° C. at a pressure of 0.5 mm. Hg. When crystallized in a mixture of methylene chloride and acetone and dried, the resulting poly(cyclohexane-1,4-dimethylene 1,3-adamantanedicarboxylate) has a melting point of 170° C. The crystallized polymer is then subjected to solid phase polymerization for 4 hours at a pressure of 0.5 mm. Hg with a capillary flow of nitrogen, and a temperature range of 180° to 190° C., the final temperature being 190° C. The inherent viscosity is 0.48 (same basis as Example 27).

EXAMPLE 29

*Polyester from adamantane dicarboxylic acid dimethyl ester-(1,3) and 1,4-dimethylol-bicyclo[2.2.2]octane*

8.4 g. of adamantane dicarboxylic acid dimethyl ester-(1,3) (0.0337 mole), 11.3 g. of 1,4-dimethylol-bicyclo[2.2.2]-octane (0.0665 mole), and 5 drops of an 8% solution of sodium hydrogen hexabutoxytitanate in n-butanol are charged into a polymer tube. Methanol is removed over a period of 2 hours as the temperature is increased to 220° C., after which the condensation is carried out at a pressure of 4.5 hours at 250–280° C. When crystallized in methylene chloride and dried, the resulting polymer has a melting point of 240° C. The crystallized polymer is subjected to solid phase polymerization for 6 hours at temperatures slowly increasing from 220° to 250° C. The resulting polymer, poly(1,4-bicyclo[2.2.2]-octanedimethylene 1,3-adamantanedicarboxylate), has a melting point of 250° C. and an inherent viscosity of 0.37 (same basis as Example 27).

EXAMPLE 30

*Polyester from adamantane dicarboxylic acid dimethyl ester-(1,3) and 2,6-dimethylol-decahydronaphthalene*

6.35 g. of adamantane dicarboxylic acid dimethyl ester-(1,3) (0.0252 mole), 10.0 g. of 2,6-dimethylol-decahydronaphthalene (0.0505 mole; predominantly the trans-isomer of the glycol), and 4 drops of an 8% solution of sodium hydrogen hexabutoxytitanate in n-butanol are charged to a polymer tube. Methanol is removed for 2 hours as the tube is heated to 230° C., after which the condensation is carried out under a vacuum for 4 hours at 260° to 285° C. When crystallized in methylene chloride, the resulting poly(decahydronaphthalene-2,6-dimethylene 1,3-adamantanedicarboxylate) has a melting point of 140° C. and an inherent viscosity of 0.2 (same basis as Example 27).

EXAMPLE 31

*Polyester from dodecahydro-4,4'-bibenzoic acid dimethyl ester and 1,3-dimethylol adamantane*

2.0 g. of dodecahydro-4,4'-bibenzoic acid dimethyl ester (0.007 mole; predominantly the trans, trans-isomer of the ester), 2.1 g. of 1,3-dimethylol adamantane (0.011 mole), and 2 drops of an 8% solution of sodium hydrogen hexabutoxytitanate in n-butanol are charged into a polymer tube. After heating for 2 hours to remove methanol (the temperature ranging up to 230° C.), the condensation is carried out under vacuum for 3.5 hours at 270° C. and 4 hours at 285° C. The polymer is subjected to solid phase polymerization by heating it under vacuum with a capillary flow of nitrogen for several hours as the temperature is gradually increased from 165° to 250° C. The resulting polymer, poly(adamantane-1,3-dimethylene dodecahydro-4,4'-bibenzoate), has a melting point of 210° C. and an inherent viscosity of 0.3 (same basis as Example 27).

EXAMPLE 32

*Polyester from diphenyl carbonate and 1,3-dimethylol adamantane*

5.4 g. of diphenyl carbonate (0.0252 mole), 6.0 g. of 1,3-dimethylol adamantane (0.0306 mole), and 4 drops of an 8% solution of sodium hydrogen hexabutoxytitanate in n-butanol are charged into a polymer tube. Over a period of 2.5 hours the tube is heated to 270° C. at atmospheric pressure with evolution of phenol, after which vacuum is applied and the condensation is carried out for 4 hours at 280° C. and 4 more hours at 300° C. The resulting polymer is subjected to solid phase polymerization by heating it under vacuum with a capillary flow of nitrogen for 6 hours as the temperature is gradually increased from 180° to 250° C. The product, poly(adamantane-1,3-dimethylene carbonate), has a melting point of 260° C. and an inherent viscosity of 0.2 (same basis as Example 27).

In addition to the polymers specifically illustrated above, a wide diversity of other addition and condensation polymers may be prepared from adamantane and biadamantane derivatives. The preparation of such polymers will be readily appreciated by one skilled in the art after review of the above disclosure. When such polymers contain the proportions of adamantyl and/or adamantylene described herein, they manifest the stability and other properties associated with these cyclic hydrocarbon groups in polymer form as shown above.

Included among the polymers specifically contemplated by this invention, in addition to those exemplified above, are poly(adamantyl vinyl ether), poly(vinyl adamantane), poly(adamantyl vinyl ketone), poly(adamantyl vinyl sulfone), and poly adamantyl urethanes as well as poly adamantyl ureas.

Polymers in which at least 25% of the repeating structural units contain at least one radical from the group adamantyl and adamantylene and at least 25% by weight of the polymer is one of said radicals, form films and fibers and are preferred. Especially useful are those polymers in which all of the adamantyl and adamantylene radicals are part of the polymer chain. Polyesters containing one or the other of these radicals in the polymer backbone are very suitable for spinning fibers and the high melting point of such polymers permits use of these fibers in applications where other fibers cannot exist.

The claimed invention:

1. A compound having the structural formula

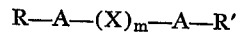

wherein

A is a 1,3-adamantylene group,
R and R' are monovalent substituents selected from the group consisting of hydrogen, halogen, lower alkyl, vinyl, allyl, phenyl and diphenyl, at least one of R and R' being a halogen,
X is a divalent radical selected from the group consisting of phenylene, biphenylene, and alkylene, and
m is an integer equal to 0 or 1.

2. A 3,3'-substituted 1,1'-biadamantane derivative having the structural formula

wherein

A is an adamantylene group, and
R and R' are monovalent substituents selected from the group consisting of hydrogen, halogen, lower alkyl, vinyl, allyl, phenyl and diphenyl, at least one of R and R' being a halogen.

3. 3,3'-dibromo-1,1'-biadamantane.

References Cited

UNITED STATES PATENTS

| | | | |
|---|---|---|---|
| 2,850,523 | 9/1958 | Dazzi | 260—468 |
| 2,862,026 | 11/1958 | Buchner et al. | 260—514 |
| 2,894,987 | 7/1959 | Stein et al. | 260—563 |
| 2,936,324 | 5/1960 | Hasek et al. | 260—617 |
| 2,953,609 | 9/1960 | Wadsworth et al. | 260—668 |
| 3,012,079 | 12/1961 | Bruson et al. | 260—648 |
| 3,037,009 | 5/1962 | Perry | 260—89.5 |
| 3,047,539 | 7/1962 | Pengilly | 260—75 |

OTHER REFERENCES

Landa et al.: "Chem. Abst.," vol. 52, col. 6213b (1958).

LEON ZITVER, *Primary Examiner.*

WILLIAM SHORT, *Examiner.*

L. P. QUAST, M. M. JACOB, *Assistant Examiners.*